United States Patent
Srivastava (10) Patent No.: US 11,507,400 B2
(45) Date of Patent: Nov. 22, 2022

(54) METHOD AND SYSTEM FOR PROVIDING REAL-TIME REMOTE ASSISTANCE TO A USER

(71) Applicant: Wipro Limited, Bangalore (IN)

(72) Inventor: Gaurav Srivastava, Hyderabad (IN)

(73) Assignee: Wipro Limited, Bangalore (IN)

( * ) Notice: Subject to any disclaimer, the term of this patent is extended or adjusted under 35 U.S.C. 154(b) by 75 days.

(21) Appl. No.: 16/816,599

(22) Filed: Mar. 12, 2020

(65) Prior Publication Data

US 2021/0271496 A1 Sep. 2, 2021

(30) Foreign Application Priority Data

Feb. 28, 2020 (IN) .............................. 202041008685

(51) Int. Cl.
*G06F 3/01* (2006.01)
*G06T 19/00* (2011.01)
(Continued)

(52) U.S. Cl.
CPC .............. *G06F 9/453* (2018.02); *G06F 3/015* (2013.01); *G06N 20/00* (2019.01); *G06T 19/006* (2013.01)

(58) Field of Classification Search
CPC .......... G06F 9/453; G06F 3/015; G06F 3/011; G06T 19/006; G06N 20/00; G06Q 10/20
See application file for complete search history.

(56) References Cited

U.S. PATENT DOCUMENTS 9,864,431 B2 1/2018 Keskin et al.
10,559,135 B1 * 2/2020 Price ...................... G06F 3/011
(Continued)

FOREIGN PATENT DOCUMENTS

WO WO-03073175 A2 * 9/2003 ............ G06F 3/015

OTHER PUBLICATIONS

Anthony, S., "First human brain-to-brain interface allows remote control over the internet, telephathy coming soon", Extreme Tech 2013, https://www.extremetech.com/extreme/165081-first-human-brain-to-brain-interface-allows-remote-control-over-the-internet-telepathy-coming-soon, 3 pages.
(Continued)

*Primary Examiner* — Jennifer N Welch
*Assistant Examiner* — K C Chen
(74) *Attorney, Agent, or Firm* — Finnegan, Henderson, Farabow, Garrett & Dunner, LLP (57) ABSTRACT

System and method of providing real-time remote assistance to a user is disclosed. In one embodiment, an assistance system, upon receiving a request from the user, captures holographic information of one or more objects associated with a task to be performed by the user. The assistance system further transmits the holographic information to an expert, wherein the expert is identified based on one or more skills required to perform the task. Further, assistance system receives one or more brain signals associated with the expert while the expert is interacting with a virtual simulation of the one or more objects to perform the task. Further the assistance system provides real-time remote assistance to the user by generating execution commands for the user in real-time based on a plurality of features associated with performing the task extracted from the one or more brain signals received from the expert.

12 Claims, 6 Drawing Sheets

(51) Int. Cl.
*G06F 9/451* (2018.01)
*G06N 20/00* (2019.01)

(56) References Cited

U.S. PATENT DOCUMENTS

| | | | |
|---|---|---|---|
| 2002/0067372 A1 | 6/2002 | Friedrich et al. | |
| 2004/0131998 A1* | 7/2004 | Marom | A61N 1/3603 607/45 |
| 2012/0131435 A1* | 5/2012 | Douris | H04W 4/02 715/230 |
| 2015/0338917 A1* | 11/2015 | Steiner | A61B 5/316 345/156 |
| 2016/0357981 A1* | 12/2016 | Tzeng | G06F 21/6218 |
| 2017/0169610 A1* | 6/2017 | King | H04N 7/157 |
| 2018/0328917 A1 | 11/2018 | Ilan | |
| 2019/0344075 A1* | 11/2019 | Bloch | A61N 1/36139 |
| 2019/0370544 A1* | 12/2019 | Wright, Jr. | G02B 27/0101 |
| 2020/0077941 A1* | 3/2020 | Keane | G16H 50/20 |
| 2020/0117336 A1* | 4/2020 | Mani | G06F 3/0304 |

OTHER PUBLICATIONS

Jiang, L. et al., "BrainNet: A Multi-Person Brain-to-Brain Interface for Direct Collaboration Between Brains", Scientific Reports 2019, pp. 1-11.

* cited by examiner

METHOD AND SYSTEM FOR PROVIDING REAL-TIME REMOTE ASSISTANCE TO A USER

TECHNICAL FIELD

This disclosure relates generally to providing virtual assistance to a user, and more particularly to a system and a method of providing real-time remote assistance to a user.

BACKGROUND

Remote assistance based services are very popular nowadays, which allows a user to obtain services through online platforms. The user can obtain remote assistance as a solution or service or product on demand from any location in the world. In conventional solutions, any person can learn new technologies or implement solutions via media content available on internet. Such services may allow user to implement the solutions on their own, however it further requires the user to repeatedly ask for assistance to understand the solution completely. In such scenario, when the user needs continuous assistance till the time a task is completed, the process may become extensive and complex. The time taken to provide final solution to the user increases if the user needs repeated solutions from an expert and has to repeatedly input queries to find a solution.

There are existing solutions which provides situation-based assistance to the user by enabling the remote experts to use existing augmented reality based technologies to guide the user. Augmented-reality is very useful in providing visual assistance to the user. Such solutions are mainly one-time generated guidance, even though there are some solutions which allows experts to provide additional information to the user. Even in such cases, the user is required to provide queries continuously and learn to implement the augmented solutions. Only a skilled operator familiar with such solutions can implement the remote solutions properly. Even the simulation technology requires an operator to be skilled enough to operate in simulated environment. Such kind of remote assistance is not useful for an inexperienced or novice user.

More research is now focused on understanding user intent in a comprehensive way. At the same time, various technologies such as augmented reality, virtual-bot, customized avatar, scenario based recorded content are known in the art to facilitate the user to perform a task. In a skilled person's brain these connections are formed during training of desired skill. When the skilled person is provided with similar environment and problem statements these patterns are followed. There are no techniques which can leverage the skills from an expert and replicate the same on an unskilled user. Accordingly, capturing guidance from the skilled expert while the skilled expert is experiencing a similar environment to that of the user, to provide comprehensive assistance to the user in real-time is significantly required to improve efficiency of virtual assistance systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In one embodiment, a method of providing real-time remote assistance to a user is disclosed. The method may include capturing, by an assistance system, holographic information of one or more objects associated with a task to be performed by the user. The method may further include transmitting, by the assistance system, the holographic information to an expert. Herein the expert is identified based on one or more skills required to perform the task. The method may further include receiving, by the assistance system, one or more brain signals associated with the expert interacting with a virtual simulation of the one or more objects to perform the task. Further, the method may include providing real-time remote assistance to the user, by the assistance system, by generating execution commands for the user based on a plurality of features associated with performing the task extracted from the one or more brain signals received from the expert.

In one embodiment, an assistance system for providing real-time remote assistance to a user is disclosed. In one example, the assistance system may include at least one processor and a computer-readable medium communicatively coupled to the at least one processor. The computer-readable medium may store processor-executable instructions, which, on execution, may cause the processor to capture holographic information of one or more objects associated with a task to be performed by the user. The processor-executable instructions, on execution, may further cause the processor to transmit the holographic information to an expert. Herein, the expert is identified based on one or more skills required to perform the task. The processor-executable instructions, on execution, may further cause the processor to receive one or more brain signals associated with the expert interacting with a virtual simulation of the one or more objects to perform the task. At last, the processor-executable instructions, on execution, may further cause the processor to provide real-time remote assistance to the user, by the assistance system, by generating execution commands for the user based on a plurality of features associated with performing the task extracted from the one or more brain signals received from the expert.

In an embodiment, the present disclosure relates to a non-transitory computer readable medium including instructions stored thereon that when processed by at least one processor may cause an assistance system to capture holographic information of one or more objects associated with a task to be performed by the user. The processor-executable instructions, on execution, may further cause the processor to transmit the holographic information to an expert. Herein, the expert is identified based on one or more skills required to perform the task. The processor-executable instructions, on execution, may further cause the processor to receive one or more brain signals associated with the expert interacting with a virtual simulation of the one or more objects to perform the task. At last, the processor-executable instructions, on execution, may further cause the processor to provide real-time remote assistance to the user, by the assistance system, by generating execution commands for the user based on a plurality of features associated with performing the task extracted from the one or more brain signals received from the expert.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present invention relates to a method and a system for providing real-time remote assistance to a user. The proposed method and system allows the user to request for remote assistance to complete a task in real-time. The assistance system captures holographic information of one or more objects associated with the task to be performed by the user. The assistance system identifies an expert based on the skills and requirements to perform the task. The identified expert is provided with the holographic information of user's environment associated with the task which may include one or more physical objects in respect of which the user requires assistance. The system proposes a creation of virtual simulation of user's environment at expert's end to capture responses and feedback from the expert in the form of one or more brain signals while the expert is interacting with the virtual simulation to perform the task. The one or more brain signals captured from the expert are transmitted over the secured communication network to the user. Thereafter, the brain-computer interface associated with the assistance system decodes the one or more brain signals associated with the expert to generate execution commands for the user to perform the task. In addition to that, the disclosed system also proposes detecting a change in state of one or more physical objects when the user is performing the task and sharing an updated holographic information of the one or more objects with the expert in real-time in order to obtain subsequent assistance from the expert to complete the task.

Figure 1:
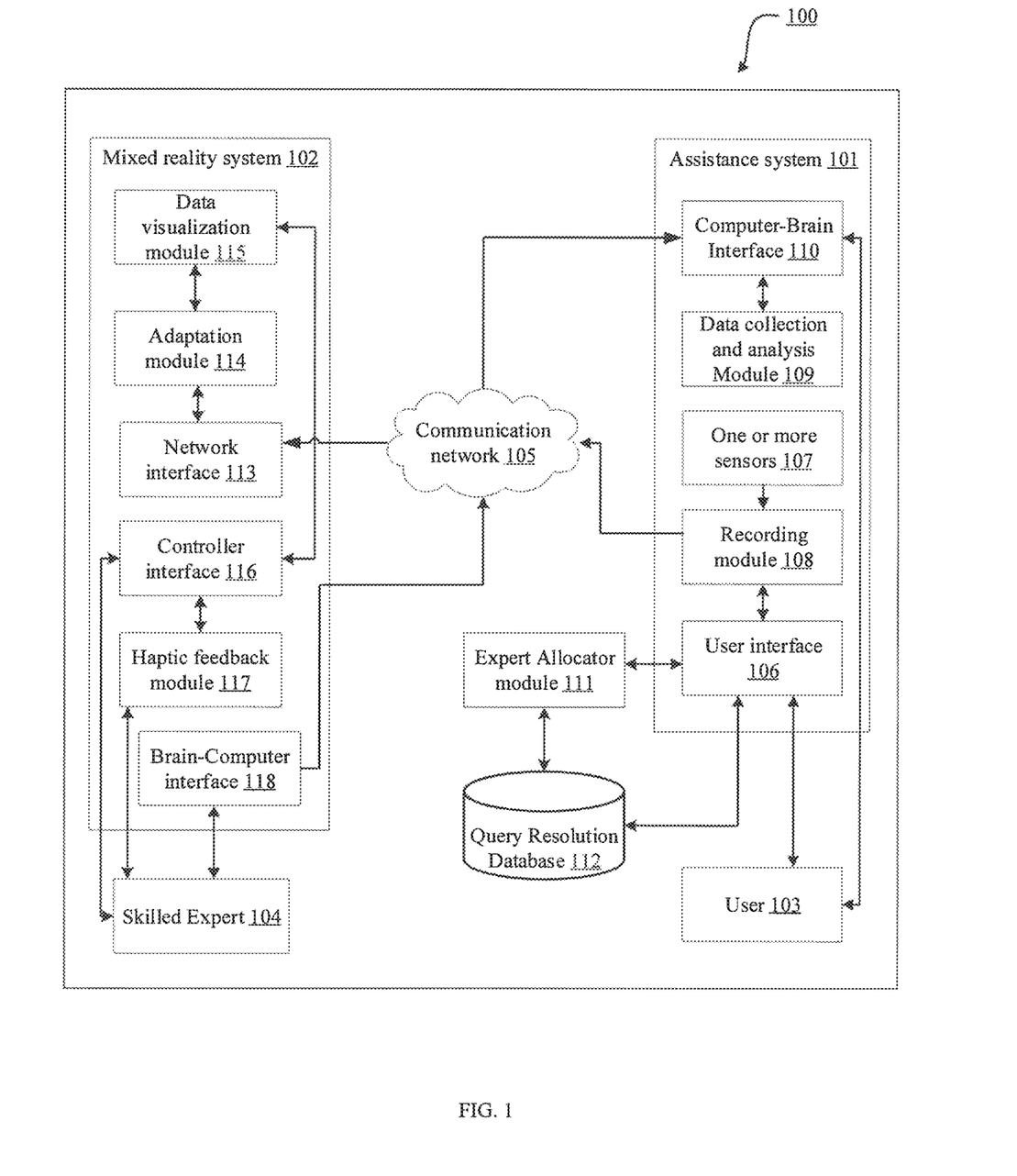
FIG. 1 illustrates an exemplary system for providing real-time remote assistance to a user, in accordance with some embodiments of the present disclosure.

Referring now to FIG. 1, a block diagram of an exemplary environment 100 for providing real-time remote assistance to a user is illustrated, in accordance with some embodiments of the present disclosure. As shown in FIG. 1, the exemplary environment 100 includes an assistance system 101 for providing real-time assistance to a user 103, remotely connected to a skilled expert 104 through a communication network 105. The assistance system 101 may include server, desktop, laptop, notebook, netbook, smartphone, mobile phone and the like. The assistance system 101 may include various modules that perform various functions for providing real-time remote assistance to the user. In an embodiment, the communication network 105 may be a high throughput network for transmitting signals in real-time for providing real-time remote assistance to the user 103 to complete a task. In addition to above, the skilled expert 104 is provided with a mixed reality system 102 for simulating user's environment, to perform one or more actions in virtual simulation of the user's environment. In an embodiment, the user's environment includes one or more objects associated with the task to be performed by the user 103.

In particular, the assistance system may include a user interface 106 through which the user 103 may request for remote assistance to complete a task. In an embodiment, the user interface 106 receives a request from the user 103 for real-time assistance and assigns respective task to the skilled expert 104. In an embodiment, the assistance system 101 may be communicatively coupled with an expert allocator module 111 to identify an expert based on required skills and availability of the expert from a query resolution database 112. The assistance system 101 may include a recording module 108 for capturing holographic information of the one or more objects associated with the task to be performed by the user 103. The one or more objects associated with the task represents user's environment for real-time assistance. For example, the user might need assistance of running a software on his computing device. Here the user's environment may include a computing device such as laptop, mobile, or desktop as an object associated with the task of executing of the software in the computing device. In another example, the user might need assistance in repairing a component in a refrigerator. Herein, the task may be repairing a compressor in a refrigerator and the user's environment includes one or more objects associated with the task such as the refrigerator, the compressor and repairing tools present in the vicinity of the user.

In an embodiment, the skilled expert 104 may be provided with a mixed reality system 102 exhibiting a virtual simulation of the user's environment. This virtual simulation may correspond to an exact virtual replication of the user's environment using mixed reality. The expert 104 may interact with this virtual simulation to virtually perform the task. When the expert virtually performs the task, the expert's brain signals may be captured. The mixed reality system 102 may include computing systems, more particularly computing system with tangible interfaces in order to receive haptic feedback from the skilled expert 104 while interacting with the virtual simulation. The mixed reality system 102 may include a network interface 113 to receive query and user environment details from the assistance system 101. The mixed reality system 102 may include various modules such as an adaptation module 114 and a data visualization module 115 for creating virtual simulation of the user's environment. The adaptation module 114 validates the details of user environment received from the assistance system and accordingly fetching necessary assets from a server (not shown in FIG. 1). The data visualization module 115 simulates a mixed reality environment for the skilled expert, which is an exact virtual replication of the user's environment. Further it includes a controller interface 116 to enable the skilled expert 104 to interact with the mixed reality environment. Further a haptic feedback module 117 provides immersive sensory to the skilled expert while interacting with virtual simulation, based on which a brain-computer interface 118 records one or more brain signals of the skilled expert 104 to be provided further for real-time remote assistance to the user.

Further, the assistance system 101 includes a computer-brain interface 110 which receives one or more brain signals associated with the skilled expert 104 through the communication network 105. The assistance system 101 includes a data collection and analysis module 109 to receive decoded brain signals from the brain-computer interface 110, and to generate one or more execution commands for the user 103 to complete the task. In an embodiment, the assistance system 101 may keep track of change in the state of the one or more objects when the user is performing the task based on remote assistance, and accordingly enable the recording module 108 to capture updated holographic information of the one or more objects to be shared with the skilled expert 104 for completion of the task.

Figure 2A:
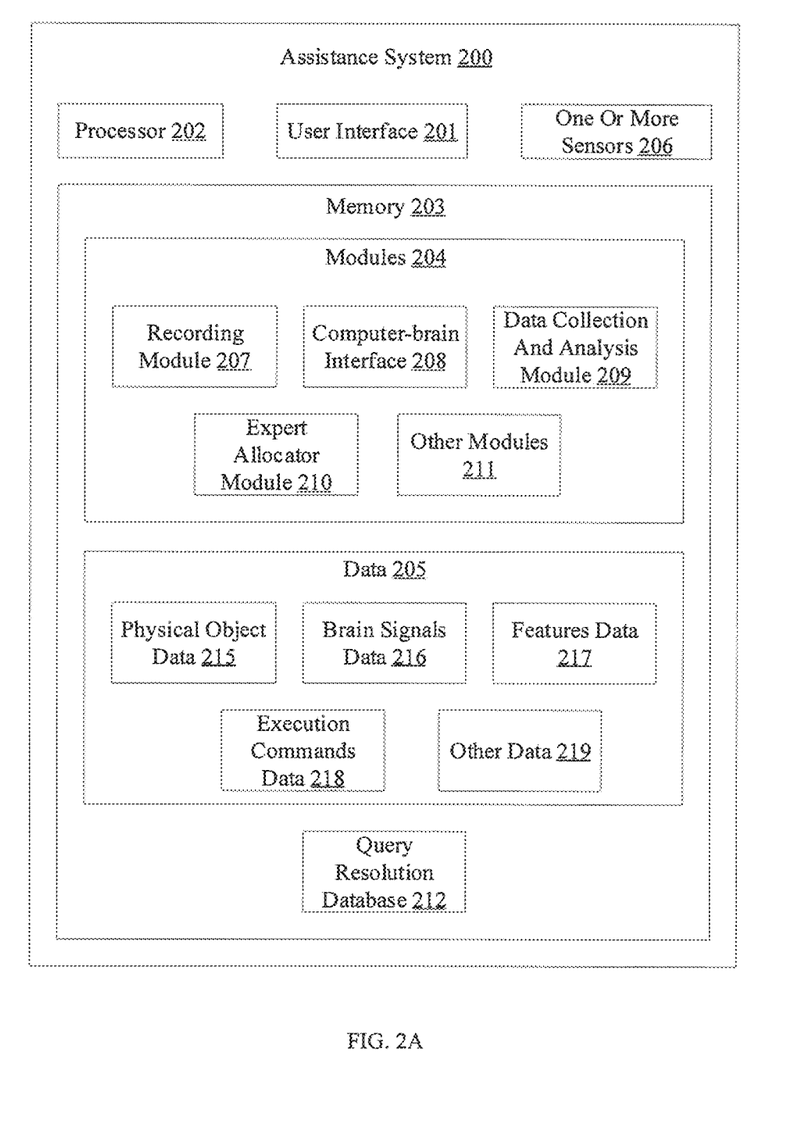
FIG. 2A is a block diagram illustrating components of an assistance system in accordance with some embodiments of the present disclosure.

Referring now to FIG. 2A, a block diagram of an assistance system 200 is illustrated, in accordance with some embodiments of the present disclosure. In particular, the assistance system 200 may include user interface 201, at least one processor 202, a memory 203 and one or more sensors 206. The memory 203 of the assistance system 200 may include various modules 204, that may store the instructions that, when executed by the at least one processor 202, cause the at least one processor 202 to perform various functions in order to provide real-time remote assistance to the user 103, in accordance with aspects of the present disclosure. In some embodiments, the assistance system 200 may include a recording module 207, a computer-brain interface 208, and a data collection and analysis module 209. In addition to above, in some embodiments, the assistance system 200 may include an expert allocator module 210, and other modules 211 to perform various functions for providing real-time remote assistance to the user to complete a task. The assistance system 200 may be communicatively coupled with a query resolution database 212, which may store user query data 213, and user credentials 214 (not shown in FIG. 2) for providing assistance to a registered user. The query resolution database 112 may reside in the memory 203 of the assistance system in some embodiments. Further, in some embodiments, the assistance system 200 may store various data 205 in the memory 203. For example, physical object data 215, brain signals data 216, features data 217, execution commands data 218, and other data 219 may be stored as data 205. As will be appreciated by those skilled in the art, all such aforementioned modules and databases 201-213 may be represented as a single module or a combination of different modules. Moreover, as will be appreciated by those skilled in the art, each of the modules and databases 201-213 may reside, in whole or in parts, on one device or multiple devices in communication with each other.

In particular, the assistance system 200 includes the user interface 201 which is configured to receive a request from the user 103 for remote assistance to complete a task in real-time. Herein, the user 103 may be an unskilled person, inexperienced person, an untrained person, or a novice who requires remote assistance from a skilled expert to perform a task. The user interface 201 takes user request in terms of query which may be audio or text input. Further, the user request may include user query data 213 in terms of what kind of assistance the user 103 would require from the assistance system 200. Upon receiving user request, the assistance system may verify user credentials 214 to check whether it is a registered user or not from a query resolution database 212. In case, the user is not registered with the assistance system 200, it allows a new user to register itself and the user credentials are updated in query resolution database 212. Further, the assistance system 200 determines the kind of skills that would be required to perform the task for which user requires real-time assistance. Accordingly, the assistance system 200 requests the expert allocator module 210 to provide a list of experts based on the required skills and the availability of the expert. The assistance system 200 identifies a skilled expert from the list of experts and triggers the skilled expert for providing remote assistance to the user.

Further, the recording module 207 allows the assistance system 200 to capture the holographic information of the one or more objects associated with the task for which the user needs assistance to complete the task. The recording module 207, upon being triggered by the user interface 206, captures the holographic information of the one or more objects in the vicinity of the user 103 for which the user needs assistance. The holographic information includes holographic images of one or more physical objects captured using one or more sensors 206, including camera. The recording module 207 is communicatively coupled with the mixed reality system 102 of the skilled expert 104 via a high throughput communication network 105. The recording module 207 streams the captured holographic information of the one or more objects to the mixed reality system 102 associated with the skilled expert 104.

Figure 2B:
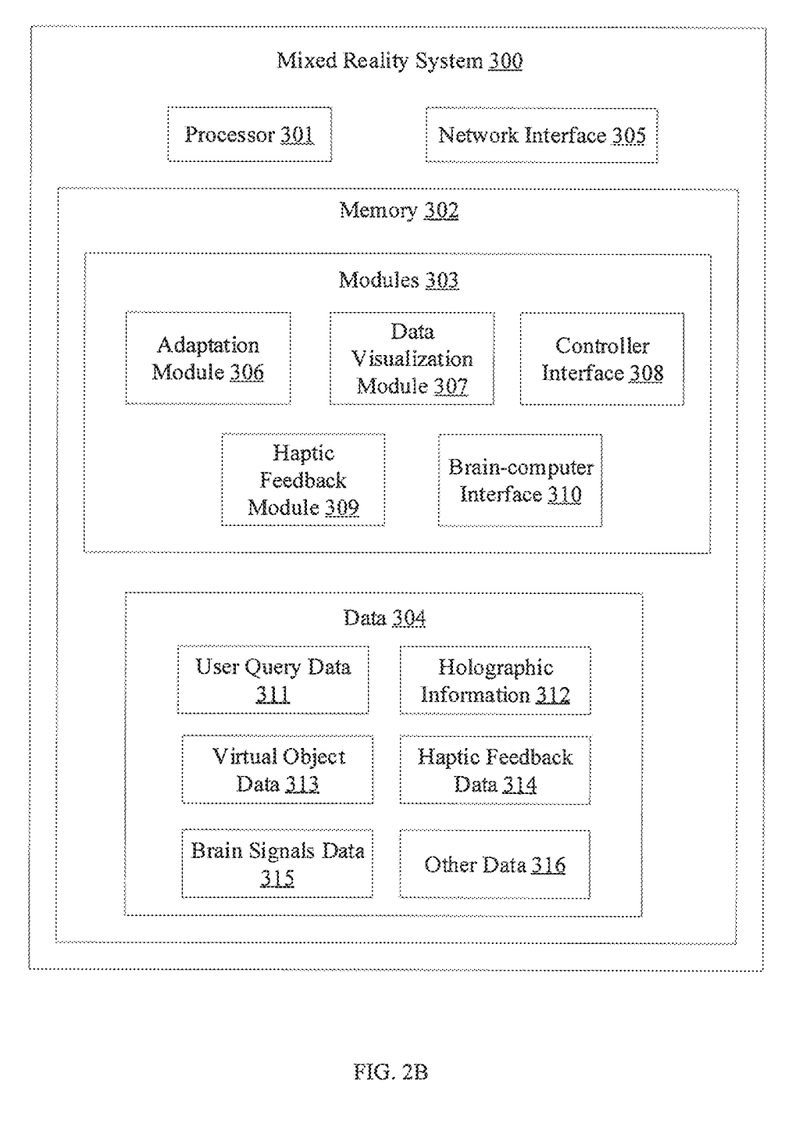
FIG. 2B is a block diagram illustrating components of a mixed reality system associated with a skilled expert, in accordance with some embodiments of the present disclosure.
Figure 3:
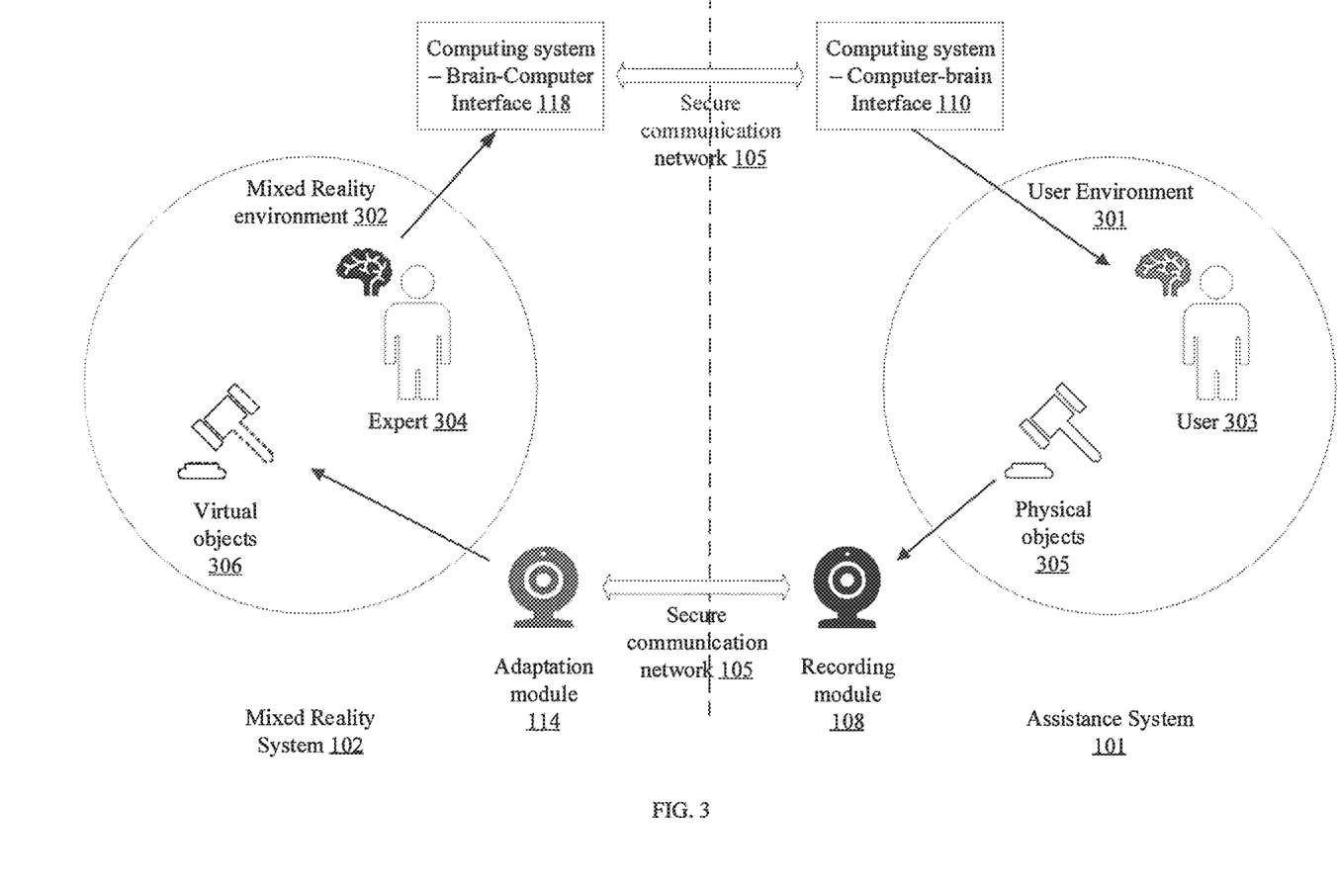
FIG. 3 is a block diagram illustrating an exemplary environment of an assistance system and a mixed reality system, in accordance with some embodiments of the present disclosure.

As will be further described in greater detail in conjunction with FIGS. 2B and 3, the assistance system 200 provides holographic information of user's environment representing one or more objects associated with the task, to the skilled expert 104 in order to generate a mixed reality environment for the skilled expert 104, and to receive one or more brain signals associated with the skilled expert 104 while interacting with the mixed reality environment to perform the task, for providing real-time remote assistance to the user 103.

FIG. 2B illustrates a block diagram of a mixed reality system associated with a skilled expert, in accordance with some embodiments of the present disclosure. The mixed reality system 300 may be configured to generate a mixed reality environment of one or more objects associated with the task to be performed by the user. The mixed reality system 300 may include at least one processor 301, and memory 302 that may store one or more instructions that, when executed by the at least one processor 301 cause the at least one processor 301 to perform various functions in order to generate virtual simulation of the one or more objects associated with the task for the skilled expert 104, in accordance with aspects of the present disclosure. The mixed reality system may include a network interface 305 to receive user query and user's environment details through the communication network 105. The mixed reality system 300 may include various modules 303 such as an adaptation module 306, a data visualization module 307, a controller interface 308, and a haptic feedback module 309, brain-computer interface 310, and the like to create virtual simulation of the user's environment for the skilled expert 104. In some embodiments, the assistance system 300 may store various data 304 in the memory 303 (for example user query data 311, holographic information 312, virtual object data 313, haptic feedback data 314, brain signals data 315, and other data 316) that may be captured, processed, and/or required for creating mixed reality environment for the skilled expert 104.

In particular, the mixed reality system 300 includes an adaptation module 306 which collects and validates the holographic information 312 associated with the one or more objects received from the assistance system 200. Upon receiving the holographic information 312 from the recording module 207, the adaptation module 306 may determine one or more assets required to create a mixed reality environment for the skilled expert. In an embodiment, the adaptation module 306 retrieves the virtual object related data 313 from a centralized server (not shown in FIG. 2B) connected with the mixed reality system to create a virtual simulation. The virtual object related data may include data related to virtual objects models and virtual scenes downloaded from the content delivery network in order to create virtual simulation based on real-world environment.

Further, the data visualization module 307 of the mixed reality system 300 maps the one or more objects associated with the task into a virtual simulation for the skilled expert through which the skilled expert can interact with the mixed reality system 300 to perform the task. The data visualization module 307 implements various motion technologies known in the state of art to generate visual representation of the one or more objects associated with the task at user's end. The controller interface 308 allows the skilled expert to perform one or more actions on the virtual representation of the one or more objects in order to assist the user 103 to complete the task.

In addition to above, the mixed reality system 300 includes the haptic feedback module 309 which responds to the movement of hands, legs or other body parts of the skilled expert. When the skilled expert is performing the one or more actions on the virtual representation of the one or more objects, the mixed reality system 300 records one or more brain signals corresponding to responses, gestures, and movements of the skilled expert. In an embodiment, the mixed reality system 300 captures touch, vibrations and motions made by the skilled expert while interacting with the virtual simulation of the one or more objects. In an embodiment, upon receiving the haptic feedback through the haptic feedback module 309, the mixed reality system 300 records one or more brain signals associated with the skilled expert through brain computer interface 310 to be shared with the unskilled user through secured communication network 105.

In addition to above, the mixed reality system 300 may encrypt the one or more brain signals recorded from the skilled expert to be transmitted across the communication network 105 to the assistance system 200. The encrypted brain signals may be encrypted using security keys provided by the assistance system 200.

Referring back to FIG. 2A, the one or more brain signals associated with the skilled expert may be received by the computer-brain interface 208 of the assistance system 200. The one or more brains signals may be decoded by the assistance system 200 to generate one or more execution commands for the user to complete the task.

In particular, the computer-brain interface 208 decrypts the encrypted form of the one or more brain signals associated with the skilled expert into plain brain signals. Further, the assistance system 200 implements extraction technique to determine meaningful information from the plain signals in order to generate one or more execution commands for the user to complete the task.

Furthermore, the data collection and analysis module 209 of the assistance system 200 extract a plurality of features associated with performing the task from the one or more brain signals decoded by the computer-brain interface 208. The one or more extraction techniques may implement existing band power, time frequency representation and the like to extract significant features for determining true intent of the brain signals. The brain signals (also referred as EEG signals) are electroencephalogram signals that records activity of brain of an individual. The plurality of features associated with brain signals represents a distinguishing property, a recognizable measurement, and a functional component obtained from a section of a pattern. The plurality of features are extracted so as to minimize the loss of important information embedded in the signal. For example, when an individual is typing in happy mood, there might be some other activities going on like eye blinking or some other muscular activity like legs shaking etc. apart from typing as main activity. In such case typing or touching on keyboard forms relevant set of features and rest are irrelevant information but the captured EEG signals will contain all of the features. In order to separate these features in given context the assistance system 200 uses feature extraction techniques. Many popular techniques known in the state of the art such as Fast Fourier Transform (FFT), Wavelet Transform (WT), Eigenvectors, Auto-regressive and the like may be used for feature extraction.

Further, the plurality of features extracted from the received brain signals are classified to clean the artifacts from the extracted features by using pre-trained machine learning model. In an embodiment, the assistance system 200 may implement classification algorithms to segregate relevant features from the artifacts. In an embodiment, the plurality of features may be further used to train the machine learning model for future extraction process. The plurality of features enables the assistance system 200 to determine intent and actions of the expert while interacting with the virtual simulation associated with performing of task. In addition to above, the extraction of plurality of features minimizes the complexity of the implementation of neural stimulation techniques by reducing the cost of information processing, and to avoid the potential need to compress the information.

Based on the plurality of features, the data collections and analysis module 209 generate execution commands for the user to perform the task. The executed commands, which are to be performed by the user, includes one or more actions and the intent determined from the plurality of features extracted from the one or more brain signals associated with the expert. This can be achieved by neural stimulation techniques known in the art. The neural stimulation techniques may be invasive or non-invasive technologies that are configured to provide motor commands and intent based communication to the user. Most general techniques known in the art are Transcranial Magnetic Stimulation (TMS), Electroconvulsive Therapy (ECT) and the invasive stimulation method are known as Deep Brain Stimulation (DBS). Similar to TMS, Transcranial Electrical Stimulation (TES) is also a non-invasive clinical methodology. Depending on the stimulation techniques, the stimulating devices is positioned on user's head, directly over the desired stimulation area. The stimulation technique provides pulses to user's brain, which in response generate electric current in the nearby neurons to produce motor commands for the user to complete the task. Upon reception of optimal neural stimulation user's body should perform same one or more actions in repeated manner as captured.

In addition to above, the performing of the one or more actions by the user 103 may results in the change of state of the objects while the user is interacting with it for completing the task. The assistance system 200 is further configured to monitor the change in the state of the one or more objects associated with the task while the user 103 is performing the one or more actions associated with the task. The recording module 207 of the assistance system 200 captured the changed state of the one or more objects associated with the task and transmit the updated holographic information of the one or more objects to the skilled expert 104. Upon transmitting the updated holographic information of the one or more objects in real-time, the assistance system 200 may further obtain subsequent brain signals associated with the skilled expert 104 for changed state of the physical objects in order to complete the task. Accordingly, the assistance system 200 is configured to provide remote assistance to the user 103 in real-time for completing the task.

It should be noted that the assistance system 200 may be implemented in programmable hardware devices such as programmable gate arrays, programmable array logic, programmable logic devices, and so forth. Alternatively, the assistance system 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

FIG. 3 is a block diagram illustrating an exemplary environment of an assistance system and a mixed reality system, in accordance with an embodiment of the present disclosure. As illustrated, the user's environment 301 includes one or more physical objects for e.g. a hammer and an object for which the user requires remote assistance to perform a task. Herein the user 303 may be unskilled, inexperienced or novice to perform the task. The recording module 108, via camera, captures the information of the one or more physical objects in the vicinity of the user 303 for which the user has requested assistance. The assistance system 101 identifies an expert 304 based on required skills to provide remote assistance to the user to complete the task. The user's environment 301 is being continuously monitored and shared with the expert via a high throughput secured communication network 105.

The mixed reality system 102 is responsible to create a mixed reality environment 302 for the expert 304, wherein the mixed reality environment virtualizes user's environment at expert end. As shown in FIG. 3, the user 303 requires assistance for repairing or reshaping a physical object from a hammer 305. The mixed reality environment for the expert is created including virtual hammer and a virtual object 306 for which the user 303 has requested for assistance. Upon receiving the request from the user and virtual simulation of user's environment, the expert 304 perform one or more actions on the virtual objects 306. The one or more actions performed by the expert 304 are captured in the form of response, gestures, movements or feedback by the expert to the mixed reality environment. The haptic feedback sensor in the mixed reality environment 302 is configured to record the one or more actions of the expert, for which a brain-computer interface 118 obtain the one or more brain signals of the expert 304. The one or more brain signals of the expert 304 indicate an intent and one or more actions of the expert while interacting with the virtual simulation to complete the task. The one or more signals captured form the expert 304 are provided to the assistance system 101 through secured high throughput network 105. The computer-brain interface 110 at the user end is configured to receive secured brain signals. The received brain signals are converted in execution commands for the user 303 and implemented using neural stimulation on the user. The one or more brain signals associated with the expert 304 are processed to extract a plurality of features containing meaningful information for performing the task. The execution commands generated for the user 303 enable the unskilled user to perform one or more actions on the physical objects 305. The assistance system 101 continuously monitor the physical object and detect any change in the state of the physical object when the user is performing the one or more actions on the physical object. Upon detecting a change in the state of physical object, the recording module 108 capture the holographic information of the physical object. The assistance system 101 transmit an updated holographic information of the physical object and received one or more subsequent brain signals from the expert for providing continuous assistance to the user in real time.

Figure 4:
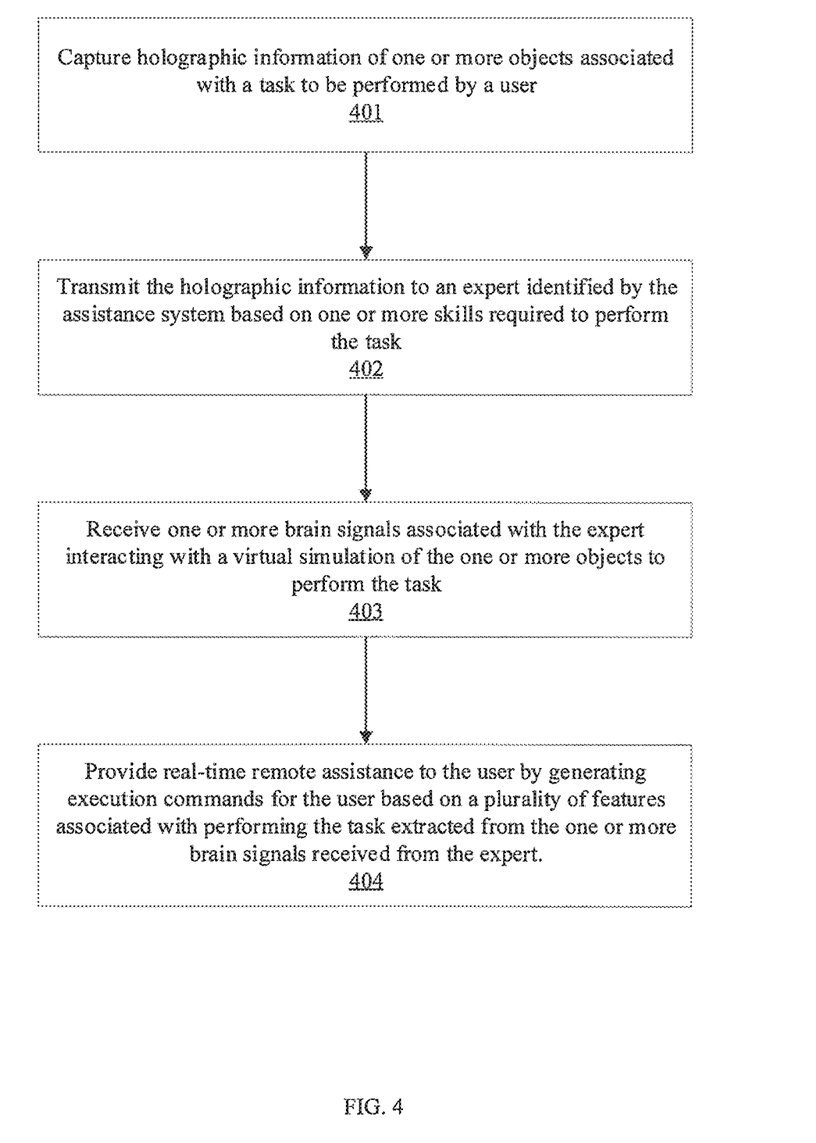
FIG. 4 is a flow diagram illustrating a process overview of providing real-time remote assistance to a user, in accordance with some embodiments of the present disclosure.

Referring now to FIG. 4, a flow diagram illustrating a process overview of providing real-time remote assistance to a user is depicted, in accordance with some embodiments of the present disclosure. A user inputs a query to request for assistance to complete a task into the user interface of the assistance system. As illustrated in the flowchart, a control logic 400, upon receiving user's request, may include the step of capturing holographic information of one or more objects associated with the task to be performed by the user, at step 401. The control logic 400 may further include the step of transmitting the holographic information to an expert identified by the assistance system based on one or more skills required to perform the task, at step 402. The control logic 400 may further include the step of receiving one or more brain signals associated with the expert interacting with a virtual simulation of the one or more objects to perform the task, at step 403. The control logic 400 may further include the step of providing real-time remote assistance to the user by generating execution commands for the user in real-time based on a plurality of features associated with performing the task extracted from the one or more brain signals received from the expert, at step 404.

In some embodiments, the control logic 400 may include one or more of following additional steps: generating neural stimulation for the user based on the execution commands, wherein the execution commands comprises one or more actions and intent determined from the plurality of features extracted from one or more brain signals associated with the expert using a trained machine learning model, at step 404. In some other embodiments, the control logic 400 may include one or more of following additional steps: detecting a change in the state of the one or more objects when the user is performing one or more actions towards completion of the task, and transmitting updated holographic information of the one or more objects to the expert.

At step 401, the assistance system 101 receives a request from the user 103 through user interface 106 requesting for remote assistance to complete a task. The assistance system 101 verifies whether the user is a registered user, else the assistance system 101 allows a new user to register itself. Upon verifying user details, the assistance system 101 captures details of one or more objects for which the user requires remote assistance. The assistance system 101 includes one or more cameras to capture holographic information of the one or more objects associated with the task. The assistance system 101 retrieves a list of experts based on the skills required to complete the task and availability of the expert from the list. In an embodiment, the assistance system 101 may connect with an expert allocator module 111 to allocate a skilled expert for the task.

At step 402, upon identifying the skilled expert, the assistance system 101 transmits the captured holographic information to the expert identified based on one or more skills required to perform the task. The assistance system 101 uses a secured network 105 to share the holographic information and user's request to the skilled expert 104. At expert's end, a mixed reality system 102 is configured to create a virtual simulation of the one or more objects associated with the task. The mixed reality system 102 includes an adaptation module 114 which validates the holographic information received for the user for its correctness and completeness. Thereafter, the adaptation module 114 fetches one or more assets required for generate virtual representation of the one or more objects associated with the task. Further, the adaptation module 114 validates on different states and positions of the one or more objects for creating virtual simulation. Upon fetching, the adaptation module 114 provides the one or more assets to a data visualization module 115 for creating a virtual simulation of the user environment for the skilled expert 104.

At step 403, the mixed reality system 102 receives one or more brain signals associated with the skilled expert 104 while interacting with a virtual simulation of the one or more objects to perform the task. The mixed reality system 102 includes a controller interface 116 which allows user to use gestures, responses and movement in the mixed reality environment. Further, the skilled expert while interacting with the virtual simulation generates touch and vibrations through gestures, responses and movement in mixed reality environment. These touches and vibrations are sensed by the haptic feedback module 117 which provide haptic feedback to the skilled expert to create similar sensory as an individual feels in real world environment. Upon receiving haptic feedback in mixed reality world, the skilled expert 104 generates one or more brain signals which are recorded by a brain-computer interface 118 using any method such as invasive, semi-invasive or non-invasive method. The brain-computer interface 118 records one or more brain signals from the skilled expert 104 while performing one or more actions associated with completing the task. The brain-computer interface 118 records EEG signals associated with the skilled expert 118, which indicate the intent and the one or more actions required to complete the task. The mixed reality system 102 transmits the recorded brain signals to the assistance system 101 to provide real-time remote assistance to the user 103.

In an embodiment, the mixed reality system 102 may encrypt the one or more brain signals associated with the skilled expert 104 using shared security key before transmitting the same over the communication network 105. The assistance system 101 employs secured throughput network to share and receive confidential and sensitive information associated with the user's environment and the EEG signals associated with the skilled expert for security reasons. The security key maybe shared by the assistance system 101 when it triggers the mixed reality system 102 of the skilled expert 104. At user's end, the assistance system 101 uses valid security key to decrypt the one or more brain signals received from the skilled expert 104.

At step 404, the assistance system 101 receives the one or more brain signals via the computer-brain interface 110, and send it to a data collection and analysis module 109 for further processing. The data collections and analysis module 109 extract a plurality of features from the one or more brain signals received from the expert. The plurality of features are extracted to derive meaningful information associated with performing the task from the received one or more brain signals. As explained above in FIG. 2A, the plurality of features are extracted using extraction techniques known in the art. The extracted features are classified to remove artifacts and noise by using a pre-defined machine-learning model. The pre-trained machine learning model may include implementation techniques such as linear analysis, nonlinear analysis, adaptive algorithms, clustering and fuzzy techniques, and neural networks.

The plurality of features after extraction and classification are translated into execution commands for the user. The computer-brain interface 110 allows the assistance system to read information from user's brain and to deliver execution commands to user's brain to perform one or more actions on the physical object. These execution commands are implemented using neural stimulation on the user to enables the user's brain to perform desirable actions for completing the task.

In an embodiment, the one or more actions taken by the user on the one or more objects caused by the neural stimulation may results in change in state of the one or more objects. The recording module 108 records the changed state of the one or more objects and provide the same to the skilled expert 104 to receive subsequent assistance for updated state of the physical till the completion of the task. In an embodiment, the adaptation module 114 triggers the assistance system 101 for last actions after observing the final state of physical object mapped into mixed reality environment. The skilled expert may give final approval of completion of task after observing rendered virtual object in mixed reality world.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
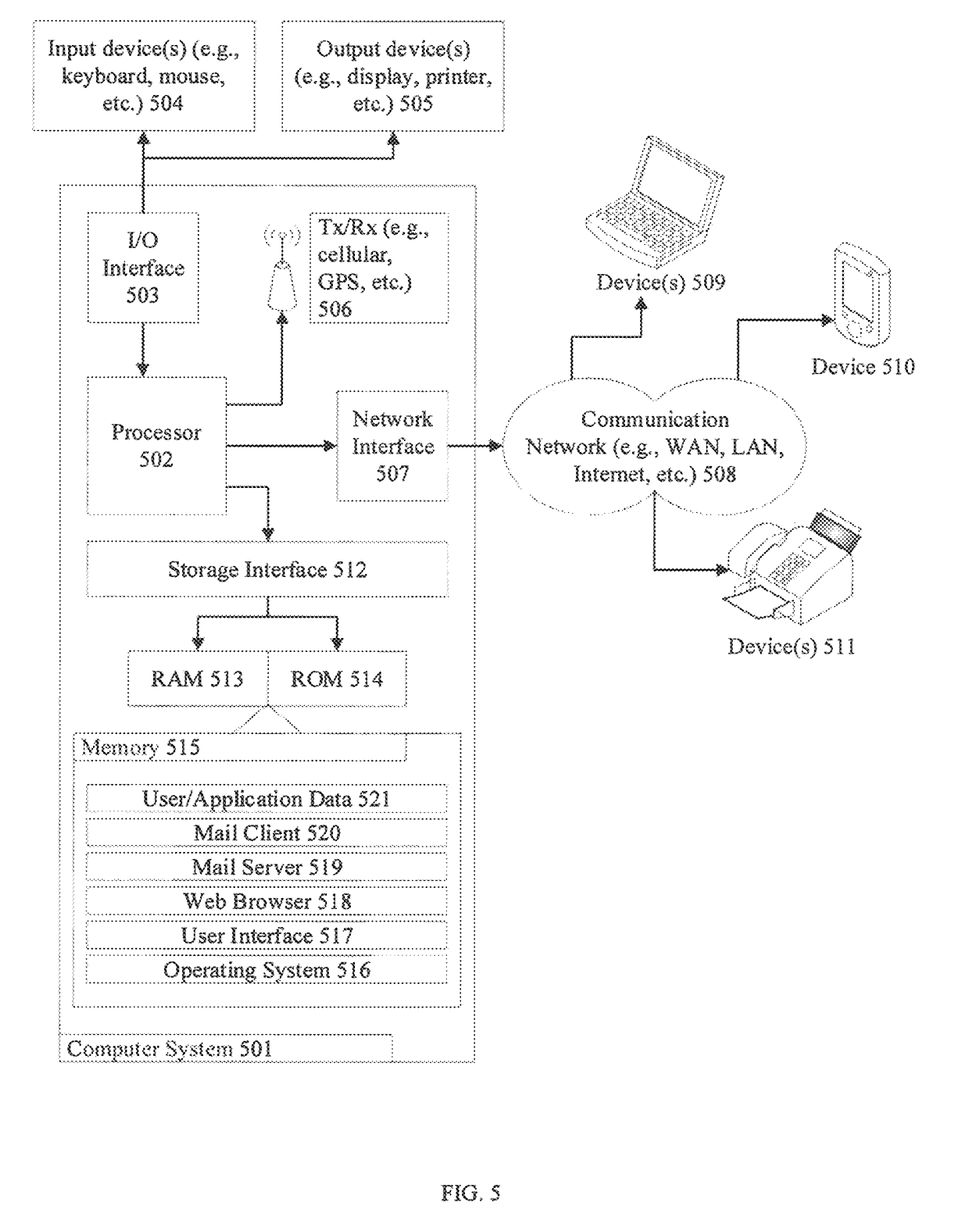
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing list all computers from other figures. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1395, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM5750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices 515 including, without limitation, memory drives, removable disc drives, etc., employing connection protocols such as serial advanced technology attachment (SATA), integrated drive electronics (IDE), IEEE-1395, universal serial bus (USB), fiber channel, small computer systems interface (SCSI), etc. The memory drives 515 may further include a drum, magnetic disc drive, magneto-optical drive, optical drive, redundant array of independent discs (RAID), solid-state memory devices, solid-state drives, etc.

The memory devices 515 may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., list here) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for providing real-time remote assistance to a user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Advantages of the Present Disclosure

Embodiments allows a user to request for remote assistance to perform a task for which the user is not skilled enough. Embodiments herein enables a user to implement software based solution as well as perform physical actions on a physical object through virtual assistance in real-time. Embodiments herein continuously monitors user's environment to provide remote assistance till the completion of task.

Embodiments leverage haptic feedback and mixed reality to create a virtual environment as a replica of user's environment, where remote expert can find himself/herself interacting with virtual objects with exact representation of physical objects in real world.

Embodiments further use brain-computer interface to receive brain signals responses of the expert, which are further processed and analyzed to implement neural stimulation on the user.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for providing real-time remote assistance to a user. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of providing real-time remote assistance to a user, the method comprising:
    capturing, by an assistance system, holographic information of one or more objects associated with a task to be performed by the user;
    transmitting, by the assistance system, the holographic information to an expert remotely connected to the user requesting real-time remote assistance to complete the task, wherein the expert is identified based on one or more skills required to perform the task;

receiving, by the assistance system, one or more brain signals associated with the expert interacting with a virtual simulation of the one or more objects to perform the task; and providing real-time remote assistance to the user, by the assistance system, by generating execution commands for the user based on a plurality of features associated with performing the task extracted from the one or more brain signals received from the expert, wherein the execution commands comprise one or more actions and intent for the user to perform the task, the execution commands are determined from the plurality of features extracted from the one or more brain signals associated with the expert and analysed using a trained machine learning model to determine intent and one or more actions of the expert while interacting with the virtual simulation associated with performing of task; wherein providing the real-time remote assistance comprises generating neural stimulation on the user based on the one or more brain signals associated with the expert interacting with the virtual simulation, and wherein generating the neural stimulation on the user comprises providing pulses to the user's brain based on the execution commands due to which an electric current is generated in nearby neurons of the user's brain to produce motor commands for the user to complete the task.

2. The method as claimed in claim 1, wherein the virtual simulation is created for the expert upon validating the holographic information received for the one or more objects associated with the task.

3. The method as claimed in claim 1 further comprising receiving the one or more brain signals associated with the expert over a secured network, wherein the one or more brain signals comprise signals related to touch, vibrations, and motions recorded from the expert while interacting with the virtual simulation of the one or more objects to perform the task.

4. The method as claimed in claim 1 further comprising detecting a change in the state of the one or more objects when the user is performing one or more actions towards completion of the task, and transmitting an updated holographic information of the one or more objects to the expert.

5. An assistance system for providing real-time remote assistance to a user, the assistance system comprising:
a processor; and
a memory communicatively coupled to the processor, wherein the memory stores processor-executable instructions, which, on execution, cause the processor to:
capture holographic information of one or more objects associated with a task to be performed by the user;
transmit the holographic information to an expert remotely connected to the user requesting real-time remote assistance to complete the task, wherein the expert is identified based on one or more skills required to perform the task;
receive one or more brain signals associated with the expert interacting with a virtual simulation of the one or more objects to perform the task; and
provide real-time remote assistance to the user by generating execution commands for the user based on a plurality of features associated with performing the task extracted from the one or more brain signals received from the expert, wherein the execution commands comprise one or more actions and intent for the user to perform the task, the execution commands are determined by the processor from the plurality of features extracted from the one or more brain signals associated with the expert and analysed using a trained machine learning model to determine intent and one or more actions of the expert while interacting with the virtual simulation associated with performing of task; wherein providing the real-time remote assistance comprises generating neural stimulation on the user based on the one or more brain signals associated with the expert interacting with the virtual simulation, and wherein generating the neural stimulation on the user comprises providing pulses to the user's brain based on the execution commands due to which an electric current is generated in nearby neurons of the user's brain to produce motor commands for the user to complete the task.

6. The assistance system as claimed in claim 5, wherein the virtual simulation is created for the expert upon validating the holographic information received for the one or more objects associated with the task.

7. The assistance system as claimed in claim 5, wherein the processor-executable instructions further cause the processor to receive the one or more brain signals associated with the expert over a secured network, wherein the one or more brain signals comprise signals related to touch, vibrations, and motions recorded from the expert while interacting with the virtual simulation of the one or more objects to perform the task.

8. The assistance system as claimed in claim 5, wherein the processor-executable instructions further cause the processor to detect a change in the state of the one or more objects when the user is performing one or more actions towards completion of the task, and to transmit an updated holographic information of the one or more objects to the expert.

9. A non-transitory computer readable medium including processor-executable instructions stored thereon that when processed by at least one processor cause an assistance system to:
capture holographic information of one or more objects associated with a task to be performed by the user;
transmit the holographic information to an expert remotely connected to the user requesting real-time remote assistance to complete the task, wherein the expert is identified based on one or more skills required to perform the task;
receive one or more brain signals associated with the expert interacting with a virtual simulation of the one or more objects to perform the task; and
provide real-time remote assistance to the user by generating execution commands for the user based on a plurality of features associated with performing the task extracted from the one or more brain signals received from the expert, wherein the execution commands comprise one or more actions and intent for the user to perform the task, the execution commands are determined by the processor from the plurality of features extracted from the one or more brain signals associated with the expert and analysed using a trained machine learning model to determine intent and one or more actions of the expert while interacting with the virtual simulation associated with performing of task; wherein providing the real-time remote assistance comprises generating neural stimulation on the user based on the one or more brain signals associated with the expert interacting with the virtual simulation, and wherein generating the neural stimulation on the user comprises providing pulses to the user's brain based on the execution commands due to which an electric current is generated in nearby neurons of the user's brain to produce motor commands for the user to complete the task.

10. The medium as claimed in claim 9, wherein the virtual simulation is created for the expert upon validating the holographic information received for the one or more objects associated with the task.

11. The medium as claimed in claim 9, wherein the processor-executable instructions cause the at least one processor to receive the one or more brain signals associated with the expert over a secured network, wherein the one or more brain signals comprise signals related to touch, vibrations, and motions recorded from the expert while interacting with the virtual simulation of the one or more objects to perform the task.

12. The medium as claimed in claim 9, wherein the processor-executable instructions cause the at least one processor to detect a change in the state of the one or more objects when the user is performing one or more actions towards completion of the task, and to transmit an updated holographic information of the one or more objects to the expert.

* * * * *